United States Patent [19]
Chang-An et al.

[11] Patent Number: 5,781,064
[45] Date of Patent: Jul. 14, 1998

[54] DIGITAL FILTERING SYSTEM FOR FILTERING DIGITAL OUTPUTS OF A FOUR LEVEL FSK DEMODULATOR

[75] Inventors: Chen Chang-An; Hsieh Bing-Yi. both of Taipei. Taiwan

[73] Assignee: Ginjet Technology Corporation. Taipei. Taiwan

[21] Appl. No.: 819,057

[22] Filed: Mar. 18, 1997

[51] Int. Cl.⁶ .............................. H03D 3/00; H04L 27/14
[52] U.S. Cl. ................... 329/300; 329/302; 329/303; 375/328; 375/335; 375/350
[58] Field of Search ..................... 329/300–303; 375/324–325, 328, 334–337, 340, 342, 350

[56] References Cited

U.S. PATENT DOCUMENTS

| | | | |
|---|---|---|---|
| 3,623,075 | 11/1971 | Bench et al. | 329/300 X |
| 5,053,717 | 10/1991 | Schulz et al. | 329/300 |
| 5,694,435 | 12/1997 | Kolle et al. | 375/342 |

*Primary Examiner*—David Mis
*Attorney, Agent, or Firm*—Winston Hsu; Keith Kline

[57] ABSTRACT

A digital filtering system for filtering a first and a second digital signals inputted from a FSK (frequency-shift-keying) demodulator to generate a first and a second filtered digital signals. The FSK demodulator is used for demodulating a four level FSK signal into the first and second digital signals. The system comprises a first shift register for recording the first digital signal as a series of digital samples, a first bit decision circuit for determining a first voltage level according to the digital samples stored in the first shift register and generating a pulse signal at a leading edge of the first digital signal, a bit clock recovery circuit for generating a bit clock signal synchronized by the pulse signal, a first D flip-flop for storing the first voltage level determined by the first bit decision circuit when the bit clock signal occurs and generating the first filtered digital signal, a second shift register for recording the second digital signal as a series of digital samples, a second bit decision circuit for determining a second voltage level according to a plurality of predetermined digital samples stored in the second shift register, and a second D flip-flop for storing the second voltage level determined by the second bit decision circuit when the bit clock signal occurs and generating the second filtered digital signal.

8 Claims, 4 Drawing Sheets

DIGITAL FILTERING SYSTEM FOR FILTERING DIGITAL OUTPUTS OF A FOUR LEVEL FSK DEMODULATOR

BACKGROUND OF THE INVENTION

1. Field of the Invention

The present invention relates to a digital filtering system, and more particularly, to a digital filtering system for filtering digital outputs of a four level FSK (frequency-shift-keying) demodulator.

2. Description of the Prior Art

Please refer to FIG. 1. FIG. 1 is a block diagram of a traditional wireless receiver 10 such as a pager for receiving four level FSK signals. The wireless receiver 10 comprises an antenna 12 for receiving RF (radio frequency) signals which are four level FSK (frequency-shift-keying) signals, a RF converter 14 for converting the received RF signals into IF (intermediate frequency) signals, an IF demodulator 16 for converting each IF signal received from port A into two digital signals over ports B and C representing the level of each received four level FSK signal, a digital filtering system 18 for filtering out various noises contained in the received digital signals, and a digital processing system 20 for processing the filtered digital signals.

In the digital filtering system 18, each digital signal received from port B is converted into a predetermined number of digital samples in series according to sampling clock signals generated by a sampling clock circuit 22 and all these digital samples are stored in a shift register 24 having a plurality of D flip-flops. The sampling rate can be 16 samples for a pager communicating in 1200 bps (bit-per-second) speed. Each of the D flip-flops is connected to a bit decision circuit 26 which is used to determine the voltage level of the received digital signal by determining the majority voltage levels of the digital samples stored in the shift register 24. If the majority of the samples are "high" voltages, a voltage "high" will be generated at port D of the bit decision circuit 26, or else a voltage "low" will be generated. In this way most of the noises contained in the received digital signal will be filtered out. The bit decision circuit 26 will also generates a pulse signal at the leading edge of the received digital signal over port E if the voltage level of the received digital signal is different from a previously received digital signal.

For each digital signal received from port C, the process is the same. The functions of the shift register 30 and the bit decision circuit 32 are the same as the shift register 24 and the bit decision circuit 26.

The functions of the two bit clock recovery circuits 28 and 34 are the same. The bit clock recovery circuit 28 is used for generating a bit clock signal over port F in a predetermined frequency which is synchronized by the pulse signal generated by the bit decision circuit 26. The two bit clock signals outputted from the two bit clock recovery circuits 28 and 34 will then be processed by a clock selection circuit 36 to determine which bit clock signal is be used. And the selected bit clock signal will be passed to the two D flip-flops 38 and 40 for latching the digital outputs generated by the two bit decision circuits 26 and 32. The digital outputs of the two D flip-flops 38 and 40 and the bit clock signals generated by the clock selection circuit 36 will be used by the digital processing system 20 for further processing.

Please refer to FIG. 2. FIG. 2 shows the input and output signals of the IF demodulator 16 shown in FIG. 1. The two output signals produced at ports B and C represent the level of each four level FSK signal inputted from port A. The four levels of a four level FSK signal represent four different frequencies ranging from low to high. The digital output produced at port B is the most significant bit and the digital output at port C is the least significant bit. The four numbers "00", "01", "11" and "10" generated at ports B and C are used to represent four FSK signals of different frequencies ranging from low to high.

In FIG. 2, when the two FSK signals "00" and "10" are received from port A consecutively, a spike 42 is generated at port C. And also when the two FSK signals "10" and "00" are received from port A consecutively, another spike 44 is generated at port C. This is because FSK signals are analog signals and the frequency changes continuously between two consecutive FSK signals of different levels. When a "00" FSK signal is followed by a "10" FSK signal, the frequency of the "00" FSK signal is increased continuously which will pass through the frequencies of the "01" and "11" FSK signals and then become the "10" FSK signal. During the transition period, the IF demodulator 16 truthfully generates digital outputs over ports B and C to reflect such level changes. The patterns of the digital outputs generated by the IF demodulator 16 over ports B and C during the transition period can be shown as below:

| port B | 0011 |
|---|---|
| port C | 0110 |

The spike 42 generated over port C is formed by the digital outputs "11" in the middle of the four digital outputs "0110". Port B has no spike because its digital outputs in the transition period are "0011". The spike 44 over port C is generated in the same manner during the transition period between the two FSK signals "10" and "00". The width of the spike 42 or 44 can vary from $\frac{1}{10}$ to $\frac{1}{3}$ of a normal FSK signal.

As described in FIG. 1, the digital signal inputted from port C is converted in a predetermined number of digital samples in series and stored in the shift register 30. And the bit decision circuit 32 will determine whether the received input signal is a voltage "high" or "low" signal. In this way all the noises contained in the received digital signal will be filtered. In FIG. 2, it shows that the spike 42 or 44 always exists between "00" and "10" FSK signals or between "10" and "00" FSK signals and the width of each spike may be from $\frac{1}{10}$ to $\frac{1}{3}$ of a normal FSK signal. That means from $\frac{1}{10}$ to $\frac{1}{3}$ of the digital samples stored in the shift register 30 are incorrect when spike 42 or 44 occurs. Such condition is all right for the bit decision circuit 32 if the received digital signal contains very few noises because the majority of the digital samples stored in the shift register 30 are correct. But if the communications environment is very noisy and many noises exist in the received digital signal, incorrect digital samples taken from the received digital signal may easily pass 50% and a wrong digital output will be generated by the bit decision circuit 32. Communication efficiency will greatly be reduced because the existence of the spikes 42 and 44.

SUMMARY OF THE INVENTION

It is therefore a primary objective of the present invention to provide a new digital filtering system for solving the problems caused by the above mentioned spikes generated by an IF demodulator when receiving four level FSK signals.

Briefly, in a preferred embodiment, the present invention includes a digital filtering system for filtering a first and a second digital signals inputted from a FSK (frequency-shift-keying) demodulator to generate a first and a second filtered digital signals, said FSK demodulator being used for demodulating a four level FSK signal into said first and second digital signals, said system comprising:

(1) a first shift register for recording the first digital signal as a series of digital samples;

(2) a first bit decision circuit for determining a first voltage level according to the digital samples stored in the first shift register and generating a pulse signal at a leading edge of the first digital signal if the voltage level of the first digital signal is different from a digital signal inputted immediately before the first digital signal;

(3) a bit clock recovery circuit for generating a bit clock signal in a predetermined frequency which is synchronized by the pulse signal of the first digital filter;

(4) a first D flip-flop for storing the first voltage level determined by the first bit decision circuit when the bit clock signal occurs and generating the first filtered digital signal;

(5) a second shift register for recording the second digital signal as a series of digital samples;

(6) a second bit decision circuit for determining a second voltage level according to a plurality of predetermined digital samples stored in the second shift register; and (7) a second D flip-flop for storing the second voltage level determined by the second bit decision circuit when the bit clock signal occurs and generating the second filtered digital signal.

The first and second digital signals are combined to form four numbers to represent the four levels of each four level FSK signal wherein the first digital signal represents the most significant bit and the second digital signal represents the least significant bit. The four levels represent four different frequencies of the four level FSK signal ranging from low to high and wherein the four numbers used to represent the four levels of the four level FSK signal ranging from low to high are "00","01", "11" and "10". A spike signal is generated at a leading edge of the second digital signal by the demodulator when the level of the FSK signal is changed from "00" to "10" or from "10" to "00". The predetermined digital samples stored in the second shift register belong to those digital samples of the second digital signals stored in the second shift register which are not be affected by the spike signal.

It is an advantage of the present invention that the digital samples generated by the spikes in the second digital signal are ignored by the second bit decision circuit when the bit clock signal occurs. Communication efficiency and accuracy can thus be greatly increased by such design.

These and other objects and the advantages of the present invention will no doubt become obvious to those of ordinary skill in the art after having read the following detailed description of the preferred embodiment which is illustrated in the various figures and drawings.

DETAILED DESCRIPTION OF THE PREFERRED EMBODIMENT

Figure 3:
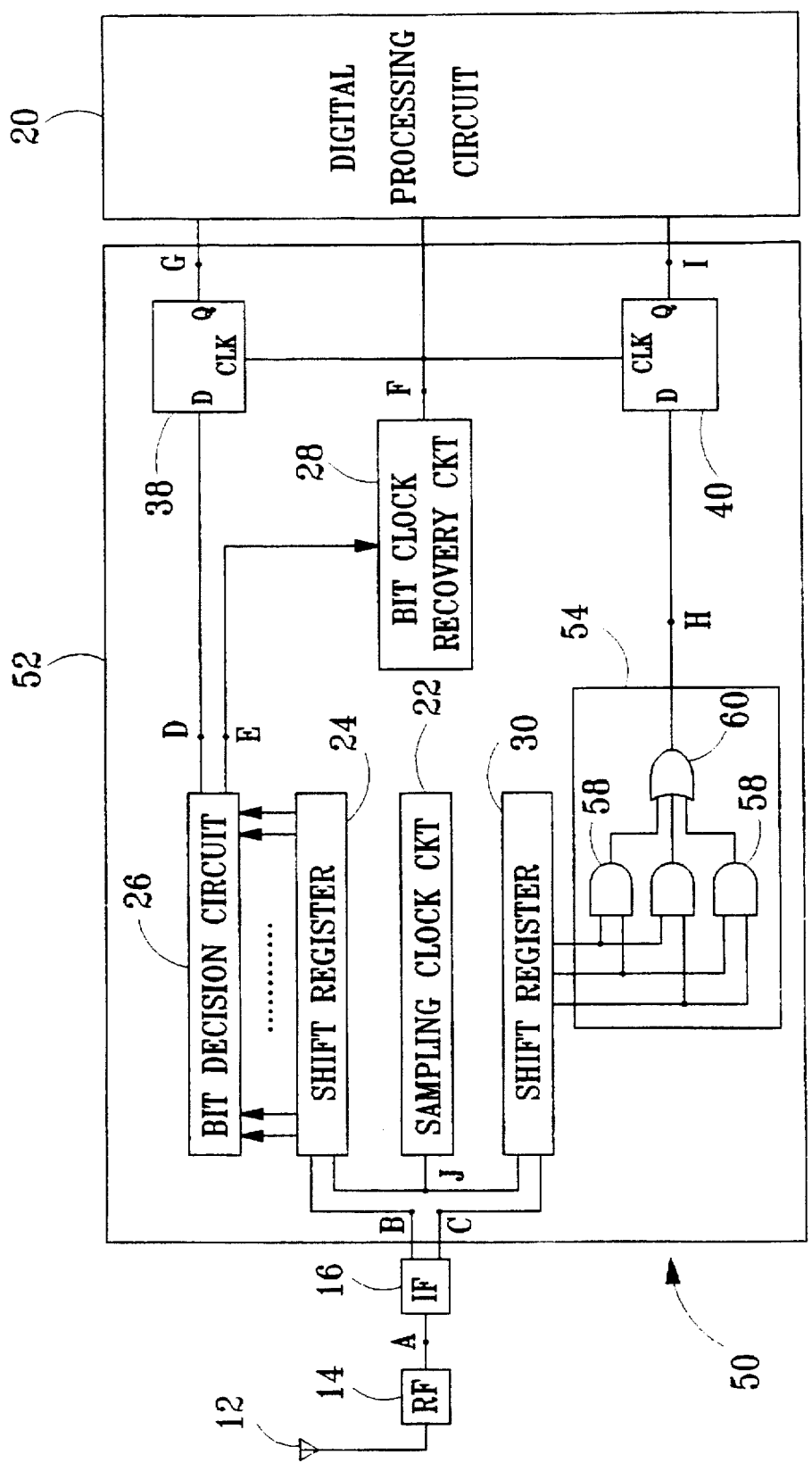
FIG. 3 is a block diagram of a wireless receiver according to the present invention.

FIG. 3 is a block diagram of a wireless receiver 50 according to the present invention. The wireless receiver 50 comprises an antenna 12 for receiving RF signals which are four level FSK signals, a RF converter 14 for converting the received RF signals into IF signals, an IF demodulator 16 for converting each IF signal received from port A into two digital signals over ports B and C representing the level of each received four level FSK signal, a digital filtering system 52 for filtering out various noises contained in the received digital signals, and a digital processing system 20 for processing the filtered digital signals.

Figure 1:
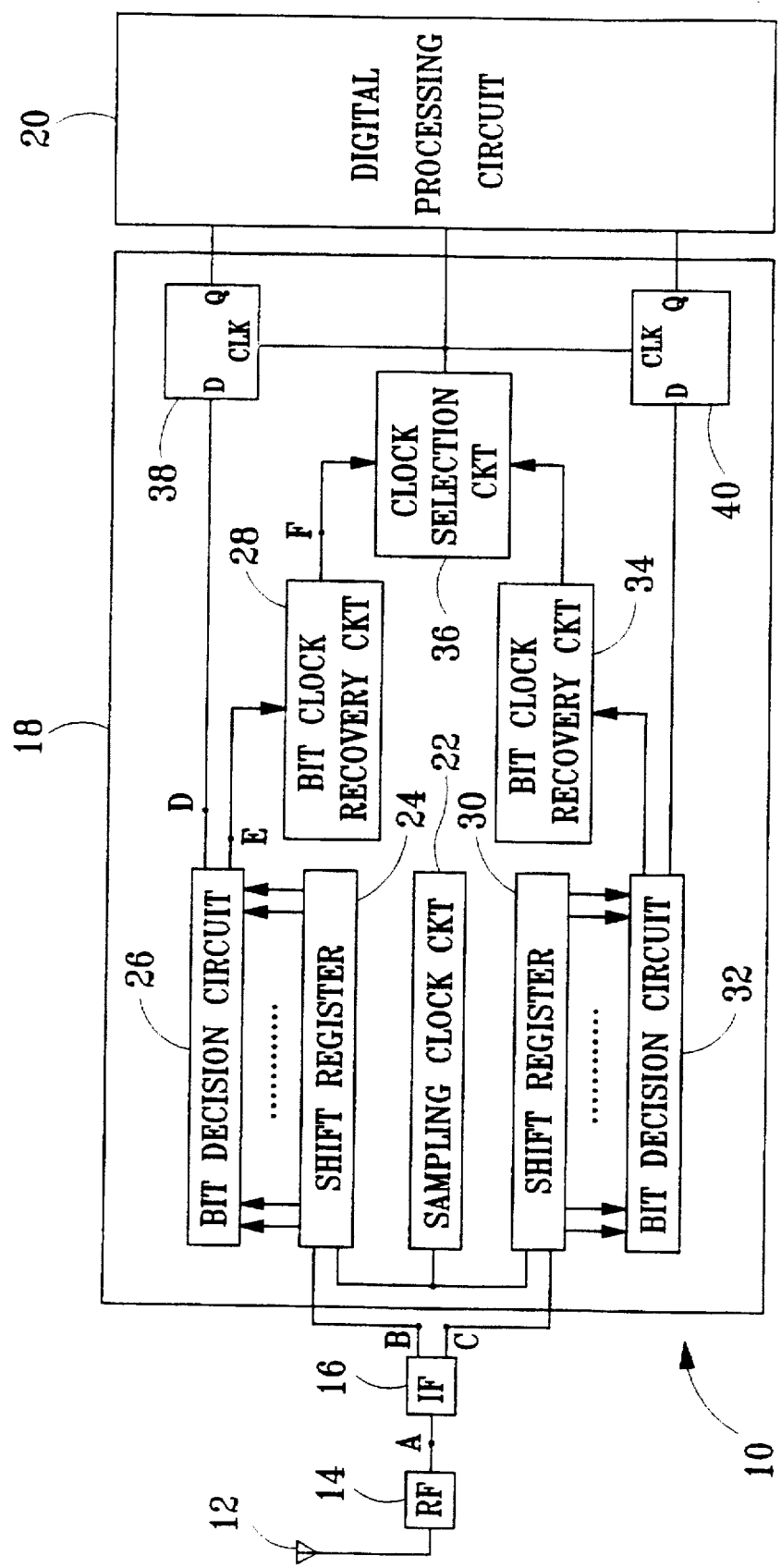
FIG. 1 is a block diagram of a traditional wireless receiver for receiving four level FSK signals.

In the digital filtering system 52, the functions of the sampling clock circuit 22, shift register 24, bit decision circuit 26 and shift register 30 are the same as the correspondent circuits of the digital filtering system 10 shown in FIG. 1. Two parts of the system 52 are different from the system 10. The first difference is that the bit clock recovery circuit 28 is used to replace the bit clock recovery circuits 28 and 34 and the clock selection circuit 36 of system 10, and the second difference is that a new bit decision circuit 54 is used to replace the bit decision circuit 32 of the system 10.

Figure 2:
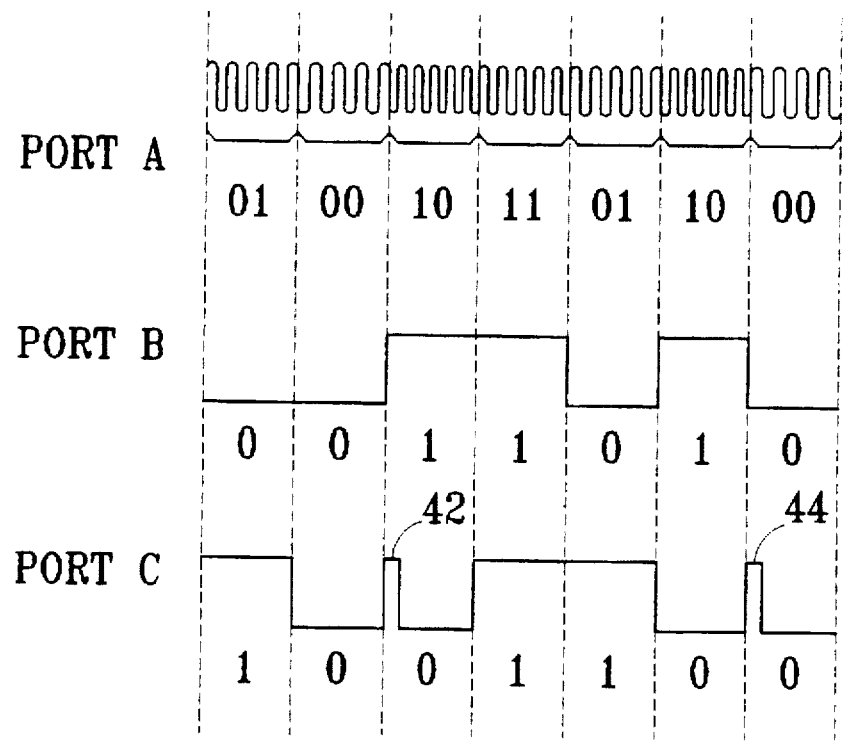
FIG. 2 shows the input and output signals of the IF demodulator shown in FIG. 1.

In FIG. 1, each of the two bit clock recovery circuits 28 and 34 is used for generating a bit clock signal with the same predetermined frequency and each bit clock recovery circuit is synchronized by the pulse signal generated by the connected bit decision circuit 26 or 32. Since each pulse signal of the bit decision circuit 26 or 32 is generated according to the leading edge of a digital signal inputted from ports B or C of the IF demodulator 16, and each digital signal presented over ports B and C are generated in the same time by the IF demodulator 16, the timing difference between the two bit clock signals generated by the two bit clock recovery circuits 28 and 34 is not significant when compared with the time interval of a FSK signal. Besides, the leading edge of the digital signal presented over port C may sometimes be interfered by the spikes 42 or 44 shown in FIG. 2 while the digital signal presented over port B has no such condition. The bit clock signals generated by the bit clock recovery circuit 28 is thus selected as the sole source for generating the bit clock signals for the two D flip-flops 38 and 40 and the digital processing circuit 20 in FIG. 3. And the bit clock recovery circuit 34 and clock selection circuit 36 shown in FIG. 1 are eliminated.

The bit decision circuit 54 contains three input ports 56 which are connected to the middle three D flip-flops (not shown) of the shift register 30. The bit decision circuit 54 contains three AND gates 58 and one OR gate 60 for determining if there are two "1"s inputted from the three input ports. Compared with the bit decision circuit 26 which is connected to all the D flip-flops of the shift register 24, the reason that the bit decision circuit 54 is only connected to the middle three D flip-flops of the shift register 30 is because all the digital samples possibly affected by the spike 42 or 44 shown in FIG. 2 at the leading edge or trailing edge of an inputted digital signal over port C are ignored in the determination process and this will be illustrated in FIG. 4.

Figure 4:
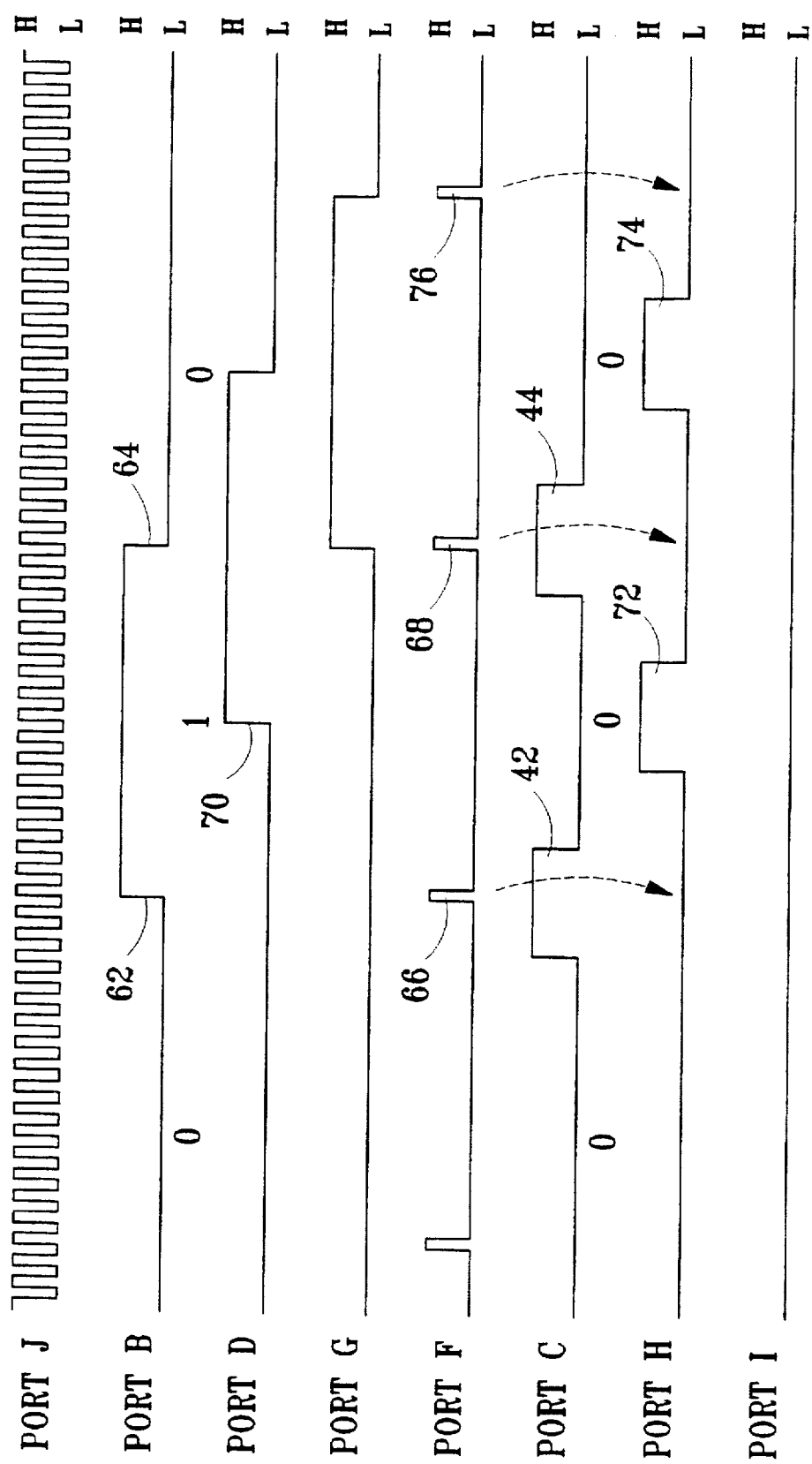
FIG. 4 is a timing diagram of the wireless receiver shown in FIG. 3.

Please refer to FIG. 4. FIG. 4 is a timing diagram of various ports of the wireless receiver 50 shown in FIG. 3. In this timing diagram, three sets of digital signals "00", "10" and "00" are inputted from ports B and C of the IF demodulator 16 consecutively. Two spikes 42 and 44 are generated by the IF demodulator 16 are generated over port C during the transition period from "00" to "10" and also from "10" to "00". The reason why the spikes 42 and 44 are generated by the IF demodulator 16 is described previously in FIG. 2. The bit clock signals generated in a predetermined frequency by the bit clock recover circuit 28 is shown as port F. When the leading edge 62 or the trailing edge 64 is detected by the bit decision circuit 26, it will generate a pulse signal (not shown) to synchronize the bit clock recovery circuit 28. And the two bit clock signals 66 and 68 are approximately synchronized by the leading edge 62 and the trailing edge 64.

The sampling clock signals generated by the sampling clock circuit 22 is shown as port J. For each sampling clock signal generated, one digital sample of the digital signal inputted from port B is recorded and shifted into the shift register 24 and another digital sample of the digital signal inputted from port C is also recorded and shifted into the shift register 30 accordingly. All the D flip-flops (not shown) of the shift register 24 are connected to the bit decision circuit 26 which will determine the majority of the digital samples stored in the shift register 24. The output of the bit decision circuit 26 over port D is changed "1" at spot 70 when more than half of the digital samples stored in the shift register 24 are "1". The digital signal outputted over port D of the bit decision circuit 26 trails the digital signal inputted from port B about half a cycle of a digital signal.

The number of D flip-flops contained in the shift register 30 is the same as the shift register 24 except that only the middle three D flip-flops are connected to the bit decision circuit 54. In this manner the output of the bit decision circuit 54 will be determined by only the three digital samples stored in the middle three D flip-flops instead of all the D flip-flops. The output of the bit decision circuit 54 is shown as port H. The two spikes 42 and 44 generated in parallel with the leading edge 62 and the trailing edge 64 are faithfully reproduced over port H as spikes 72 and 74. The digital signal outputted over port H of the bit decision circuit 54 also trails the digital signal inputted from port C about half a cycle of a digital signal.

The D flip-flops 38 and 40 are controlled by the bit clock signals of the bit clock recovery circuit 28. Since each bit clock signal shown in port F is approximately synchronized with the beginning of each digital signal inputted from ports B and C, and also approximately synchronized with the middle point of each digital signal outputted from ports D and H of the bit decision circuit 24 and 54, the digital signals latched into the two D flip-flops 38 and 40 are exactly the digital signals inputted previously from ports B and C one cycle ago.

For example, when the bit clock signal 68 occurs, the two digital signals "10" inputted from ports B and C one cycle ago and also outputted from ports D and H half cycle ago, are latched into the D flip-flops 38 and 40 separately. The spike 72 reproduced at port H is filtered out in this process. And when the bit clock signal 76 occurs, another two digital signals "00" outputted from ports D and H half cycle ago are latched into the D flip-flops 38 and 40 separately and the spike 74 reproduced at port H is also filtered out.

The reason that the spikes 42 and 44 and various noises contained in a digital signal inputted from port C can be filtered out by the digital filtering system 52 is because the beginning and ending portions of the digital signal which may be affected by the spikes 42 or 44 are ignored by the bit decision circuit 54 and only the middle portion of the digital signal are used to determine the voltage level of the inputted digital signal. The bit clock signal generated by the bit clock recovery circuit 28 is used to latch the middle spot of the digital signal outputted from port H of the bit decision circuit 54 which is generated by using only the middle three digital samples of the digital signal inputted from port C. The number of digital samples needed by the bit decision circuit 54 to determine the voltage level of the inputted digital signal can be changed depending on the width of the middle portion of the digital signal which will not be affected by the spikes 42 and 44.

The above disclosure is not intended as limiting. Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A digital filtering system for filtering a first and a second digital signals inputted from a FSK (frequency-shift-keying) demodulator to generate a first and a second filtered digital signals, said FSK demodulator being used for demodulating a four level FSK signal into said first and second digital signals, said system comprising:

(1) a first shift register for recording the first digital signal as a series of digital samples;

(2) a first bit decision circuit for determining a first voltage level according to the digital samples stored in the first shift register and generating a pulse signal at a leading edge of the first digital signal if the voltage level of the first digital signal is different from a digital signal inputted immediately before the first digital signal;

(3) a bit clock recovery circuit for generating a bit clock signal in a predetermined frequency which is synchronized by the pulse signal of the first digital filter;

(4) a first D flip-flop for storing the first voltage level determined by the first bit decision circuit when the bit clock signal occurs and generating the first filtered digital signal;

(5) a second shift register for recording the second digital signal as a series of digital samples;

(6) a second bit decision circuit for determining a second voltage level according to a plurality of predetermined digital samples stored in the second shift register; and (7) a second D flip-flop for storing the second voltage level determined by the second bit decision circuit when the bit clock signal occurs and generating the second filtered digital signal.

2. The digital filtering system of claim 1 wherein the first and second digital signals are combined to form four numbers to represent the four levels of each four level FSK signal wherein the first digital signal represents the most significant bit and the second digital signal represents the least significant bit.

3. The digital filtering system of claim 2 wherein the four levels represent four different frequencies of the four level FSK signal ranging from low to high and wherein the four numbers used to represent the four levels of the four level FSK signal ranging from low to high are "00", "01", "11" and "10".

4. The digital filtering system of claim 3 wherein a spike signal is generated at a leading edge of the second digital signal by the demodulator when the level of the FSK signal is changed from "00" to "10" or from "10" to "00".

5. The digital filtering system of claim 4 wherein the predetermined digital samples stored in the second shift register belong to those digital samples of the second digital signals stored in the second shift register which are not be affected by the spike signal.

6. The digital filtering system of claim 1 wherein the first bit decision circuit determines the majority of the voltage levels of the digital samples stored in the first shift register first and then produces the first voltage level according to the majority of the voltage levels of the digital samples stored in the first shift register.

7. The digital filtering system of claim 1 wherein the second bit decision circuit determines the majority of the voltage levels of the predetermined digital samples stored in the second shift register first and then produces the second voltage level according to the majority of the voltage levels of the digital samples of the predetermined digital samples stored in the second shift register.

8. The digital filtering system of claim 1 further comprising a sampling clock circuit for generating a plurality of sampling clock signals of a predetermined frequency and wherein the first and second digital signals are recorded into the first and second shift registers in series according to the sampling clock signals.

* * * * *